United States Patent [19]

Sagane et al.

[11] 4,385,138

[45] May 24, 1983

[54] THERMOSETTING POWDER RESIN BASED WATER-SLURRY COATING COMPOSITION

[75] Inventors: Masahiro Sagane; Ichiro Tabuchi, both of Kanagawa, Japan

[73] Assignee: Kansai Paint Co., Ltd., Amagasaki, Japan

[21] Appl. No.: 257,199

[22] Filed: Apr. 24, 1981

[30] Foreign Application Priority Data

Jun. 7, 1980 [JP] Japan .................................. 55/76083

[51] Int. Cl.$^3$ ...................... C08L 63/02; C08L 75/06
[52] U.S. Cl. .................................... 523/402; 427/409; 427/410; 523/334; 523/444; 524/46; 524/339; 524/377; 524/548; 524/591; 524/601; 524/904; 525/934
[58] Field of Search ................... 260/29.2 EP, 29.2 E, 260/29.2 TN, 29.6 NR, 29.6 T; 525/934; 528/499; 524/548, 591, 601, 377, 904, 339; 523/402, 221, 334

[56] References Cited

U.S. PATENT DOCUMENTS

| | | | |
|---|---|---|---|
| 3,787,230 | 1/1974 | Hoffman et al. | 427/336 |
| 4,100,315 | 7/1978 | Lauterbach | 427/379 |
| 4,122,055 | 10/1978 | Tugukuni et al. | 260/29.2 EP |
| 4,150,007 | 4/1979 | McCollum | 260/29.2 EP |

FOREIGN PATENT DOCUMENTS

| | | |
|---|---|---|
| 48-45529 | 6/1973 | Japan . |
| 54-132630 | 10/1979 | Japan . |
| 54-144442 | 11/1979 | Japan . |
| 55-433 | 1/1980 | Japan . |
| 55-4149 | 1/1980 | Japan . |
| 55-4150 | 1/1980 | Japan . |
| 55-4341 | 1/1980 | Japan . |
| 55-4342 | 1/1980 | Japan . |

OTHER PUBLICATIONS

"Acetylene Glycol" by Ishii et al., The Finish & Paint (Japanese Name Toso To Toryo), Feb. 1978, No. 293, published on Jan. 25, 1978, pp. 43 to 49.

*Primary Examiner*—Theodore E. Pertilla
*Attorney, Agent, or Firm*—Fisher, Christen & Sabol

[57] ABSTRACT

A thermosetting powder resin based water-slurry coating composition prepared by dispersing water insoluble thermosetting resin particles and an adduct of a structurally symmetrical diol having a molecular weight of from 90 to 300 with ethylene oxide or propylene oxide, or a mixture thereof in an aqueous medium. The composition provides improvements in the anti-sedimentation properties and redispersibility of particles, and consequently in the extended storage stability and application performance thereof. The composition is applied to form a film with excellent smoothness, gloss, water resistance, moisture resistance, corrosion resistance, etc., without developing any pinholing and cratering by solvent popping, and checking on film formation by heating.

7 Claims, No Drawings

THERMOSETTING POWDER RESIN BASED WATER-SLURRY COATING COMPOSITION

BACKGROUND OF THE INVENTION (1) Field of the Invention

This invention relates to a thermosetting powder resin based water-slurry coating composition, and particularly relates to a thermosetting powder resin based water-slurry coating composition (hereinafter referred to as a water-slurry coating composition) improved in the anti-sedimentation properties and redispersibility of particles in the slurry and capable of forming a film having excellent smoothness, gloss, and other physical and chemical properties such as water resistance, moisture resistance, corrosion resistance, and the like without developing any checking, and phenomena of foaming in a coating of the slurry mainly due to a sudden evaporation of a dispersing medium and of developing pinholes, and craters in a film due to foaming, which phenomena are hereinafter referred to simply as pinholing and cratering by solvent popping, on film formation by heating.

(2) Description of the Prior Art

A great demand for the elimination of environmental pollution as well as saving of resources in the field of coatings and coating compositions has recently arisen, and water-slurry coating compositions have been developed for practical use in order to meet the demand.

For example, U.S. Pat. No. 3,787,230 corresponding to Japanese Patent Laid-Open Publication No. 45529/1973 discloses a method of applying a powder paint to an article to be coated by forming a slurry of uniformly suspended non-water soluble powder paint in water, and also discloses a wide variety of film formers such as acrylic resins, alkyds, vinyls, polyesters, nylons, epoxy resins, and the like as the basis for the powder paint. The water-suspended resin slurry as above is formed by dispersing a resin powder having a particle size normally ranging from 1 to 10 microns in a water-based medium at a solids content of from 10 to 60 percent by weight, so that the above formulation has such advantages that the coating procedure for the conventional liquid paint is available without any environmental pollution and toxicity due to organic solvents used, and that a finish with a relatively thick film can be obtained by a single coating procedure.

The water-suspended resin slurry has further such advantages that the film formed therefrom has good water resistance, moisture resistance, chemical resistance, etc. because a surface active agent is not used in large amounts as an ingredient thereof.

It should be pointed out, however, that the water-dispersed resin slurry with advantages as above has the following drawbacks due to its own property.

The typical drawback is in that a relatively large amount of watersoluble thickening agent, an inorganic pigment dispersion including an extender pigment, a water soluble resin, etc., must be used.

Japanese Patent Publications Nos. 4149/1980 and 4150/1980 disclose aqueous dispersion coating compositions in which an aqueous resin or an aqueous resin having an auxiliary chemically reactive group is incorporated. These aqueous dispersion coating compositions are, however, unsatisfactory in connection with water resistance, and moisture resistance, and the coexistence of the aqueous resin therewith results in sedimentation of resin particles in the water dispersion system to cause poor dispersion stability.

Further, Japanese Patent Publication No. 4342/1980 discloses a water-dispersed coating composition in which a hydrophilic ultrafine inorganic compound, that is, the aforesaid inorganic pigment is incorporated in the water dispersion system. The coating composition, however, inevitably has such a drawback that the mineral pigment inhibits the flow characteristic on melting of resin on film formation by heating, and consequently reduces the smoothness, gloss, etc., of the film. The coating composition further has such a drawback that pinholing and cratering by solvent popping, and checking are liable to develop in the film on film formation by heating.

In order to overcome the problems described above, Japanese Patent Laid-Open Publication No. 132630/1979, for example, discloses a water-dispersed thermosetting resin coating composition in which polyethylene glycol having an average molecular weight of from 200 to 10,000 is added to a special thermosetting resin powder. The film formed therefrom is inevitably degraded in water resistance and moisture resistance. Moreover, the coating composition is unsatisfactory in connection with the anti-sedimentation properties and redispersibility of particles in the slurry coating composition, and consequently with the extended storage stability of the coating composition.

As a characteristic example in the case where a water soluble resin is incorporated, Japanese Patent Publication No. 433/1980 discloses an aluminum flake pigmented slurry coating composition. According to the coating composition, an intention to obtain a film with good brightness may be achieved, but the coating composition apparently has drawbacks described above.

For the purpose of overcoming problems particular to the slurry type coating composition in connection with the application and preparation thereof, Japanese Patent Laid-Open Publication No. 144442/1979 discloses a method of applying a slurry paint which comprises heating a substrate beforehand so that its surface temperature may be 50° C. or higher, applying the slurry paint thereon at prescribed surface temperature, and heating to a temperature higher than the melting point or softening point of the film forming material in the slurry paint to form a film, and Japanese Patent Publication No. 4341/1980 discloses a process for the preparation of a slurry type water-dispersed coating composition which comprises mixing a paint component containing resin as the major ingredient to form a pellet-form composition, adding water and a surface active agent to the composition to reduce the surface tension of the resulting mixed solution to less than 35 dyne/cm, and grinding the composition in water to disperse the paint component in the liquid. Further, U.S. Pat. No. 4,100,315 discloses a process for the production of a thin, homogeneous, adhesive, non-porous film of lacquer on a metal surface an aqueous composition suspension having extended storage stability and comprising a solid thermosetting synthetic resin fine powder and a wetting agent selected from a special alkylphenyloxyethylate and a special amino-coconut fatty acid oxyethylate, drying, and curing the composition. These processes described above, however, teach nothing about the subject matter of the present invention which consists in solving simultaneously the problems in connection with the stability of dispersed resin particles in the dispersion such as anti-sedimentation properties and redispersibility of particles; the flow characteristic on melting of resin on film formation by heating such as the development of pinholing and cratering by solvent popping, and checking; physical and chemical properties of a cured film such as gloss, smoothness, water resistance, moisture resistance, and corrosion resistance; and the like.

SUMMARY OF THE INVENTION

An object of this invention is to provide an improved thermosetting powder resin based water-slurry coating composition.

Another object of this invention is to provide a thermosetting powder resin based water-slurry coating composition capable of forming a film having excellent physical and chemical properties such as smoothness, gloss, water resistance, moisture resistance, and corrosion resistance without developing pinholing and cratering by solvent popping, and checking on film formation by heating.

A further object of this invention is to provide a thermosetting powder resin based water-slurry coating composition improved in the anti-sedimentation properties and redispersibility of particles in the water-slurry coating composition, and in extended storage stability and application performance thereof.

The above objects of this invention can be achieved by using an adduct of a structurally symmetrical diol having a molecular weight of from 90 to 300 with ethylene oxide or propylene oxide, or a mixture thereof, the adduct having such a highly specified effect as not to be known in the art in the technical field of the water-slurry coating composition as such an additive as to stabilize the dispersion of thermosetting resin particles, which are water insoluble and solid at room temperature, to promote the flow characteristic on melting of thermosetting resin particles, and further to have little or no adverse effect on film performance such as gloss, smoothness, water resistance, and moisture resistance, the additive being hereinafter referred to simply as a flow agent.

DETAILED DESCRIPTION OF THE INVENTION

The present invention provides a thermosetting powder resin based water-slurry coating composition comprising a slurry formed by dispersing thermosetting resin particles (hereinafter referred to simply as resin particles), which are water insoluble and solid at room temperature, and an adduct of a structurally symmetrical diol having a molecular weight determined by the method of molal depression of freezing point, of from 90 to 300 with ethylene oxide or propylene oxide, or a mixture thereof in an aqueous medium, preferably by dispersing 100 parts by weight of the resin particles and 1 to 20 parts by weight of the adduct in 40 to 400 parts by weight of the aqueous medium.

That is, the flow agent used in the water-slurry coating composition of the present invention is an adduct of a structurally symmetrical diol having a molecular weight of from 90 to 300 with ethylene oxide or propylene oxide, or a mixture thereof.

The diol of a molecular weight less than 90 for use in the flow agent results in showing such a similar property to ethylene glycol as to be unsatisfactory for film performances, particularly for water resistance and moisture resistance.

The diol of a molecular weight more than 300 results in increasing the property thereof as a surface active agent to unfavorably degrade the water resistance and moisture resistance of the film. The molecular weight of the diol is preferably in the range of from 150 to 250.

Examples of the diol in the adduct as the flow agent in the present invention include bisphenol A, cyclohexane-1,4-diol, n-butane-1,4-diol, n-pentane-1,5-diol, n-hexane-1,6-diol, 1,4-dimethyl-n-butane-1,4-diol, 1,4-diethyl-n-butane-1,4-diol, 3,6-dimethyl-4-octyne-3,6-diol, 2,4,7,9-tetramethyl-5-decyne-4,7-diol, and the like, preferably 3,6-dimethyl-4-octyne-3,6-diol, and 2,4,7,9-tetramethyl-5-decyne-4,7-diol.

The adduct used in the present invention is preferred, for example, to be a compound having such a structure as to form a hydrophobic chain composed of ethylene oxide added to two hydroxyl group positions of the diol as represented by the formula:

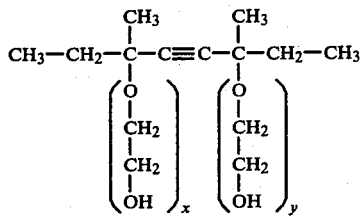

where x, and y represent the numbers of ethylene oxide added to respective hydroxyl group positions, by adding 4 to 100 moles of ethylene oxide to one mole of a structurally symmetrical diol represented by the formula:

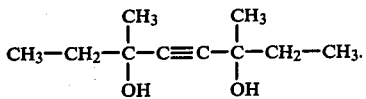

The basic properties of the compounds having an acetylene bond among the structurally symmetrical diols as above and the adducts thereof with the ethylene oxide are widely outlined along with examples of the anti-foaming properties and anti-cissing properties or wetting properties of the adducts in a thermosetting acrylic resin emulsion and air drying alkyd resin primer systems in "The Finish & Paint" (Japanese name "TOSO TO TORYO", February, 1978, No. 293, published on Jan. 25, 1978, pages 43 to 49), which, however, teaches nothing about solving the problems in the water-slurry system of the present invention as specified above.

When the number of moles to be added to ethylene oxide or propylene oxide is less than 4, the solubility of the adduct in water is decreased to be different for use. When the number of moles to be added of ethylene oxide or propylene oxide is more than 100, the adduct formed shows almost the same properties as polyethylene glycol or polypropylene glucol such that the film properties are unfavorably degraded. The number of moles to be added of ethylene oxide or propylene oxide is preferably in the range of from 10 to 50.

The adduct of the diol with propylene oxide has a poorer hydrophilic nature than that of the diol with ethylene oxide, and, as the case may be, has such a tendency as to be sparingly soluble in water, so that the adduct of the diol with propylene oxide is preferably used along with the adduct of the diol with ethylene oxide to be added to resin particles followed by a dispersing step by an attritor, or the like.

The amount to be added of the flow agent may vary depending on the type of the flow agent used, but the flow agent may be usable in an amount of from 1 to 20 parts by weight based on 100 parts by weight of resin particles. An amount less than one part by weight of the flow agent only shows a slight improvement in dispersion stability, and results in an unsatisfactory effect on promoting the fusion of particles. The use of more than 20 parts by weight of the flow agent has such a tendency that the film performances are unfavorably degraded. The flow agent is used preferably in the range of from 2 to 10 parts by weight based on 100 parts by weight of resin particles.

The addition of conventional water-soluble thickening agents, water-soluble resins, inorganic pigments, surface active agents, and the like in about the same amount as that of the flow agent in the present invention apparently results vital defects on the coating composition and film performance as described above such that is is understood that the flow agent suitable for specified characteristics of the water-slurry coating composition can not be substituted by any other known materials.

That is, the flow agent used in the present invention is considered to have such properties as a nonionic surface active agent having structurally at least a hydrophobic moiety and hydrophilic moiety, but the hydrophobic nature of the aforesaid adduct in the present invention is weaker than that of the conventional nonionic surface active agents, and the hydrophobic moiety is positioned between hydrophilic molecular chains to function very favorably for the dispersion stability of resin particles. The film performance such as water-resistance and moisture resistance is markedly improved compared with the system where water-soluble resin or polyethylene glycol is used.

The resin particles used in the present invention should be water insoluble and solid at room temperature, and have film-forming properties. The resin particles may include any resin particles usable as powder coating without any specified limitations, and also include pigments, etc.

That is, the resin particles used in the present invention include resin particles of film-forming resins which are cured by heating after coating to form a film having specified properties, and, if required, contain conventional crosslinking or curing agents, pigments, additives, fillers, etc. Thus, the resin particles in the present invention may composed of thermosetting resins along, and also composed of a mixture thereof with pigments, etc.

The glass transition temperature and melting point of the resin particles in the present invention are determined depending on film performance and dispersion stability, and the values thereof differ depending on the type of film-forming resins.

In the case of the water-slurry coating composition of the present invention, the dispersion stability is to improved by the incorporation of the flow agent that resin particles having a relatively low glass transition temperature or melting point may be usable, and the resin particles should be solid at room temperature and have a softening point of from 30° to 120° C. The softening point lower than 30° C. is liable to cause blocking between resin particles and causes gelation during storage after formulated as coating compositions to be unfavorably unstable for use.

On the other hand, the softening point higher than 120° C. makes it unfavorably difficult to obtain a good smoothness coating surface even though a large amount of the flow agent may be used.

The resin particles in the present invention have preferably an average particle size of from 3 to 50 microns. When the average particle size is less than 3 microns, the apparent viscosity of the coating composition is increased due to the increase of thixotropic properties in the coating composition system. The increase in the apparent viscosity as above makes it difficult to obtain a thick finish coating because in the application of the coating composition, for example, in spray coating the solids content of the coating composition system is decreased as the result of controlling the viscosity therein to an appropriate extent.

On the other hand, when the average particle size is greater than 50 microns, the smoothness of coating surface after film-formation by heating is unfavorably degraded.

Further, the resin particle size is preferred to have an average particle size less than 30 microns, for example, to be free of clogging of a spray gun nozzle. The average particle size is measured by an optical microscope or centrifugal sedimentation optical transmission type particle size distribution measuring device.

The specified examples of film-forming resins constituting the resin particles used in the present invention include thermosetting resins such as epoxy resins, epoxypolyester resins, polyester resins, acrylic resins, polyurethane resins, and the like.

The aqueous medium used in the present invention may contain one or more than one selected from surface active agents, hydrophilic solvents, water-soluble thickening agents, and inorganic pigments in addition to water as the major ingredient.

The surface active agent added to the aqueous medium in the present invention, which is added to promote dispersion of the resin particles, includes anionic, cationic, nonionic, and amphoteric surface active agents, and is preferably used in an amount of from 0.01 to 1.0 part by weight based on 100 parts by weight of water. When the amount thereof to be added is less than 0.01 part by weight, the effect to promote dispersion of the resin particles is unfavorably decreased. On the other hand, when the amount thereof to be added is more than 1.0 part by weight, the water resistance and moisture resistance of the film are liable to be unfavorably degraded.

Examples of anionic surface active agents include alkyl sulfate, polyoxyethylene alkyl ether sulfate, alkylsulfo-succinate, N-acyl-sarcosinate, $\beta$-naphthalenesulfonic acid formalin condensate salt, and the like.

Examples of cationic surface active agents include quaternary ammonium salt, pyridinium salt, and the like.

Examples of nonionic surface active agents include sorbitan fatty acid ester, polyoxyethylene sorbitan fatty acid ester, polyoxyethylene sorbitol fatty acid ester, polyoxyethylene fatty acid ester, polyoxyethylene alcohol ether, glycerin fatty acid ester, polyoxyethylene caster oil derivatives, polyoxyethylene alkylphenyl ether, alkyl phosphate ester, polyoxyethylene phosphate ester, and the like.

The hydrophilic solvent known in the art may be added to improve the storage stability of the water-slurry coating composition of the present invention in an amount of from 0.01 to 5 parts by weight based on 100 parts by weight of water.

The hydrophilic solvent is preferred to have no solubility for the resin particles at room temperature, and to have a boiling point above 180° C. Examples of the hydrophilic solvent include ethylene glycol, diethylene glycol, triethylene glycol, propylene glycol, dipropylene glycol, 1,4-butane diol, 1,3-butylene glycol, hexylene glycol, dipropylene glycol, tripropylene glycol, pentanediol, peptanediol, and the like.

The water-soluble thickening agent known in the art may be added to the aqueous medium in the present invention in order to prevent the film from sagging down and to improve the anti-sedimentation properties of the water-slurry coating composition, and consequently the storage stability thereof in an amount of from 0.1 to 1.0 part by weight based on 100 parts by weight of the resin particles. The amount thereof to be added less than 0.01 part by weight is not satisfactorily effective, and the amount more than 1.0 part be weight degrades the film appearance, particularly gloss and smoothness.

Examples of the water-soluble thickening agent used in the present invention include alkali salts of carboxyl group containing acrylic copolymers, polyvinyl pyrrolidones, polyacrylamides, cellulose derivatives, polyethylene oxides preferably having a molecular weight more than 30,000, and the like.

The inorganic pigments known in the art may also be added to the aqueous medium in the present invention in order to prevent the film sagging and to further improve the storage stability of the water-slurry coating composition in an amount of from 0.01 to 3.0 parts by weight based on 100 parts by weight of the resin particles. Examples of the inorganic pigment used in the present invention include silica, aluminium oxide, calcium carbonate, clay, bentonite, talc, etc., in the form of fine powder. The amount to be used less than 0.01 part by weight is not effective. When more than 3.0 parts by weight, the gloss of the film is decreased, and the flow characteristic on melting of resins is hindered to be unsatisfactory.

The surface tension adjusting agent known in the art, which is also called as the surface levelling agent, may also be added to the resin particles in the present invention in order to prevent cissing of the coating in an amount not more than 1% by weight relative water. The surface tension adjusting agent used in the present invention includes those normally used in the water-based coatings such as acrylic oligomers, silicone oil, and the like.

The resin partiles used in the present invention are prepared in such a manner that a resin composition as a starting material is allowed to melt for kneading, and thereafter cooled to be pulverized, or that the resin composition is dissolved in a solvent and allowed to disperse, and thereafter the solvent used is removed followed by finely pulverizing the resulting resin composition.

The resin particles used in the present invention are dispersed in the aqueous medium by mixing the pulverized resin particles with the aqueous medium followed by dispersing the resin particles to specified particle sizes by use of the conventional dispersion apparatus such as a ball mill, sand grinding mill, and attritor. The flow agent is usually added after dispersion step, but the dispersion procedure, if required, may be carried out after the addition of the flow agent.

The water dispersion of the resin particles in the present invention is prepared by dissolving a resin composition as a starting material in a hydrophilic solvent followed by spraying into water to obtain a water dispersion of fine resin particles. If required, the particle size may be adjusted by use of the conventional dispersion means, and the flow agent may also be added.

In accordance with the water-slurry coating composition of the present invention, particularly the use of the flow agent specified above results in marked improvements in the anti-sedimentation properties and redispersibility of particles in the water-slurry coating composition, and consequently in the extended storage stability and application performance thereof compared with the conventional water-slurry coating composition.

Accordingly, the water-slurry coating composition according to the present invention has such special and remarkable effects compared with the water-slurry coating composition known in the art that the flow characteristic on melting of the resin on film formation by heating the water-slurry coating composition is so improved that neither pinholing and cratering by solvent popping nor checking are developed, and that the film performances of the cured coating such as gloss, smoothness, water resistance, moisture resistance, and corrosion resistance are also improved.

The present invention will be described in more detail by the following Examples.

In the Examples, part and % are represented by weight respectively.

EXAMPLES 1-11, COMPARATIVE EXAMPLES 1-7

Respective starting ingredients are dryblended in accordance with the following formulation, and then allowed to melt for kneading with an extruder at about 100° C. followed by cooling to be pulverized. The resulting particles are screened by a sieve to obtain grey epoxy thermosetting resin particles having a particle size of from 30 to 100 microns.

| Ingredients | Parts |
| --- | --- |
| Bisphenol A type diepoxy resin[1] | 94.0 |
| Dicyandiamide-imidazole curing agent | 6.0 |
| Rutile titanium dioxide | 50.0 |
| Carbon black | 2.0 |
| Surface levelling agent | 1.0 |
| | 153.0 |

[1]Softening point: about 95° C.; Epoxy equivalent: about 950.

Thereafter, the resin particles thus obtained are subjected to the preparation of four water-dispersed curable coating compositions, that is, A-1, A-2, A-3, and A-4 (hereinafter referred to simply as coating compositions A-1, A-2, A-3, and A-4 respectively).

Preparation of Coating Composition A-1

An aqueous solution consisting of 82 parts of deionized water and 0.1 part of a cationic surface active agent (marketed by Hoechst AG under the registered trademark GENAMIN-0-050) is added to 100 parts of the resin particles, and is stirred in a dispersion mixer to obtain the coating composition A-1. The observation of the particle size by a microscope shows that the particle size is in the range of from 30 to 100 microns, the average particle size being about 60 microns.

Preparation of Coating Composition A-2

To 182.1 parts of the coating composition A-1, 40 parts of deionized water is added and the resulting mixture is subjected to dispersion in a pebble ball mill for 20 hours to obtain the coating composition A-2. The particle size is observed by a microscope to be in the range of from 5 to 25 microns, the average particle size being about 15 microns.

Preparation of Coating Composition A-3

To 182.1 parts of the coating composition A-1, 100 parts of deionized water is added, and the resulting mixture is subjected to dispersion in a pebble ball mill for 50 hours to obtain the coating composition A-3. The particle size is observed by a microscope to be in the range of from 3 to 10 microns, the average particle size being about 6 microns.

Preparation of Coating Composition A-4

To 182.1 parts of the coating composition A-1, 150 parts of deionized water is added, and the resulting mixture is subjected to dispersion in an attritor for 6 hours to obtain the coating composition A-4. The particle size is observed by a microscope to be in the range of from 3 to 5 microns, the average particle size being about 4 microns.

To the coating composition A-1, A-2, A-3, or A-4 thus obtained, adducts prepared by adding respective amounts of ethylene oxide as indicated in Table 1 to one mole of bisphenol A are added as the flow agent in an amount as indicated in Table 1 respectively to obtain water-slurry coating compositions respectively.

The water-slurry coating compositions thus obtained are subjected to tests for the anti-sedimentation properties and redispersibility of resin particles, smoothness of the coating surface, water resistance, pinholing and cratering by solvent popping, and checking as described below.

Anti-sedimentation properties and redispersibility of resin particles

The water-slurry coating composition is stirred, and then settled in a room at 20° C. for 15 days to observe a degree of sedimentation and to evaluate anti-sedimentation properties of resin particles. Thereafter, the water-slurry coating composition is stirred again to evaluate redispersibility of resin particles from a degree of easiness or difficulty of dispersion therein.

Smoothness of Coating Surface, Water Resistance, Pinholing and Cratering by Solvent Popping, and Checking The water-slurry coating composition is diluted with deionized water to a viscosity of 20 seconds Ford Cup #4 to be air-sprayed on a zinc phosphate processed steel plate (0.8 mm in thickness, processed by BONDELITE #3118, the registered trademark of Nihon Parkerrizing Co., Ltd., marketed by Nippon Testpanel Kogyo Co., Ltd.) to a dry film thickness of 60±10 microns, and then baked at 180° C. for 30 minutes. The coated plates thus obtained are subjected to evaluation of smoothness of the coating surface, water resistance, and checking for the coating film thus formed.

However, in the case of evaluation of pinholing and cratering by solvent popping, the water-slurry coating composition is sprayed on the processed steel plate to form a continuous, inclinatory coating film having a dry film thickness between minimum about 20 microns and maximum about 90 microns, and then the coated plate is left to stand at room temperature for 5 minutes followed by baking under the same schedules as above.

Furthermore, a white amino-alkyd resin coating composition (marketed by Kansai Paint Co., Ltd. under the registered trademark AMILAC #805) is sprayed on the coated plates obtained as above to be baked at 140° C. for 30 minutes. THe resulting coating film is subjected to a water immersion test at 40° C. for 40 days to evaluate the coating surface.

THe results of the aforesaid tests are shown in Table 1.

TABLE 1

| Examples | Coating Composition | Flow Agent * | Flow Agent ** | Anti-sedimentation Properties of Particles | Redispersibility | Smoothness of Coating Surface | Water Resistance | Checking | Pinholing and Cratering by Solvent Popping |
|---|---|---|---|---|---|---|---|---|---|
| Com. Ex. 1 | A-1 | — | — | 1 | 1 | 1 | 4 | 2 | 1 |
| Com. Ex. 2 | A-1 | 8 | 0.5 | 1 | 1 | 2 | 4 | 2 | 2 |
| Com. Ex. 3 | A-1 | 8 | 1.0 | 2 | 3 | 3 | 4 | 3 | 3 |
| Ex. 1 | A-1 | 8 | 2.0 | 3 | 3 | 4 | 4 | 4 | 3 |
| Ex. 2 | A-1 | 8 | 5.0 | 4 | 4 | 4 | 4 | 4 | 3 |
| Ex. 3 | A-1 | 8 | 10.0 | 4 | 4 | 4 | 4 | 4 | 3 |
| Ex. 4 | A-1 | 8 | 15.0 | 4 | 4 | 4 | 3 | 4 | 3 |
| Com. Ex. 4 | A-1 | 8 | 20.0 | 4 | 4 | 4 | 3 | 4 | 3 |
| Com. Ex. 5 | A-2 | — | — | 1 | 2 | 2 | 4 | 2 | 1 |
| Ex. 5 | A-2 | 6 | 5.0 | 3 | 4 | 4 | 4 | 4 | 3 |
| Ex. 6 | A-2 | 8 | 5.0 | 3 | 4 | 4 | 4 | 4 | 3 |
| Ex. 7 | A-2 | 20 | 5.0 | 4 | 4 | 4 | 4 | 4 | 3 |
| Ex. 8 | A-2 | 50 | 5.0 | 4 | 4 | 4 | 3 | 4 | 3 |
| Ex. 9 | A-2 | 80 | 5.0 | 3 | 4 | 4 | 3 | 4 | 3 |
| Com. Ex. 6 | A-3 | — | — | 2 | 2 | 3 | 4 | 2 | 2 |
| Ex. 10 | A-3 | 8 | 5.0 | 3 | 4 | 4 | 4 | 4 | 3 |
| Com. Ex. 7 | A-4 | — | — | 2 | 2 | 3 | 4 | 2 | 2 |
| Ex. 11 | A-4 | 8 | 5.0 | 3 | 4 | 4 | 4 | 4 | 3 |

*Number of moles of ethylene oxide added per one mole of bisphenol A (and so forth).
**Number of parts of the flow agent added based on 100 parts of the solid content in the coating composition (and so forth).

The results of the aforesaid tests are evaluated in accordance with the following grades 1, 2, 3, and 4 respectively (and so forth).

Evaluation of Anti-sedimentation Properties of Resin Particles

After leaving to stand indoors at 20° C. for 15 days, hard precipitates are formed (grade 1, bad); soft precipitates are formed (grade 2, poor); a supernatant liquid is formed a little (grade 3, good); and little or no sedimentation takes place (grade 4, excellent).

Evaluation of Redispersibility

After leaving to stand indoors at 20° C. for 15 days, stirring for redispersion is difficult (grade 1, bad); 5 minutes' continuous stirring is required for redispersion (grade 2, poor); stirring for a period of 1 to 5 minutes enables redispersion (grade 3, good); and stirring for a period shorter than one minute enables redispersion (grade 4, excellent).

Visual Evaluation of Smoothness of Coating Surface

Smoothness is bad and gloss is poor (grade 1), smoothness is poor and gloss is poor (grade 2), smoothness is ranked fair (grade 3), and smoothness is good (grade 4).

Evaluation of Water Resistance

Blisters are formed and gloss is decreased (grade 1, bad), blisters are formed all over the surface (grade 2, poor), small blisters are formed (grade 3, good), and small blisters are partly formed in a small amount, or no blisters are formed (grade 4, excellent).

Evaluation of Checking

Checking is formed all over the surface (grade 1, bad), partly formed (grade 2, poor), formed in an extremely small portion of the surface (grade 3, good), and no checking is formed (grade 4, excellent).

Evaluation of Pinholing and Cratering by Solvent Popping

Pinholing and cratering by solvent popping is developed when a dry film has a thickness less than 40 microns (grade 1, bad), when the film has a thickness of from 40 to 60 microns (grade 2, poor), and when the film has a thickness more than 60 microns (grade 3, excellent).

Comparative Example 8

Ethylene glycol (5 parts) is added as a hydrophilic solvent based on 100 parts of water in the coating composition A-2 described above to obtain a coating composition. The coating composition provides a little bit improved smoothness of the cured film compared with Comparative Example 5, but has little or no effect on preventing the sedimentation of resin particles.

Examples 12–23

Adducts prepared by adding 10 and 30 moles on the average of ethylene oxide respectively to 2,4,7,9-tetramethyl-5-decyne-4,7-diol are added as a flow agent to the aforesaid coating compositions A-1, A-2, A-3, and A-4 respectively to be subjected to the same tests as above. The results of the tests are shown in Table 2.

TABLE 2

| Examples | Coating Composition | Flow Agent * | Flow Agent ** | Anti-sedimentation Properties of Particles | Redispersibility | Smoothness of Coating Surface | Water Resistance | Checking | Pinholing and Cratering by Solvent Popping |
|---|---|---|---|---|---|---|---|---|---|
| 12 | A-1 | 10 | 5.0 | 3 | 4 | 4 | 4 | 4 | 3 |
| 13 | A-1 | 30 | 5.0 | 4 | 4 | 4 | 4 | 4 | 3 |
| 14 | A-2 | 10 | 5.0 | 3 | 4 | 4 | 4 | 4 | 3 |
| 15 | A-2 | 10 | 10.0 | 3 | 4 | 4 | 4 | 4 | 3 |
| 16 | A-2 | 30 | 1.0 | 3 | 4 | 3 | 4 | 3 | 3 |
| 17 | A-2 | 30 | 2.0 | 3 | 4 | 4 | 4 | 4 | 3 |
| 18 | A-2 | 30 | 5.0 | 3 | 4 | 4 | 4 | 4 | 3 |
| 19 | A-2 | 30 | 10.0 | 4 | 4 | 4 | 4 | 4 | 3 |
| 20 | A-2 | 30 | 15.0 | 4 | 4 | 4 | 3 | 4 | 3 |
| 21 | A-2 | 30 | 20.0 | 4 | 4 | 4 | 3 | 4 | 3 |
| 22 | A-3 | 30 | 5.0 | 4 | 4 | 4 | 4 | 4 | 3 |
| 23 | A-4 | 30 | 5.0 | 4 | 4 | 4 | 4 | 4 | 3 |

*Number of moles of ethylene oxide added.
**Number of parts of the flow agent added.

COMPARATIVE EXAMPLE 9, EXAMPLES 24 AND 25

To 100 parts of the epoxy thermosetting resin particles used in Example 1, 122 parts of deionized water is added and stirred in a dispersion mixer followed by dispersing in a pebble ball mill for 20 hours to obtain a water-slurry coating composition. The observation by a microscope shows that the water-slurry coating composition contains resin particles having a particle size of from 10 to 30 microns, the average particle size being about 20 microns.

The water-slurry coating composition has such a bad anti-sedimentation properties of the resin particles as in Comparative Example 1, and the resulting coating film has a bad smoothness of the coating surface, and a poor gloss (Comparative Example 9).

Thereafter, 5 parts of an adduct of 2,4,7,9-tetramethyl-5-decyne-4,7-diol with 30 moles on the average of ethylene oxide based on 100 parts of the solid content of the aforesaid water-slurry coating composition is added as the flow agent with the result that the smoothness of the coating surface is markedly improved and that almost the same results as in Example 18 are obtained with respect to other properties in the tested items as above (Example 24).

On the other hand, the flow agent is mixed simultaneously with the resin particles and deionized water at the aforesaid proportion followed by stirring in a dispersion mixer and by dispersing in a pebble ball mill for 15 hours to obtain a water-slurry coating composition having a high degree of dispersion, the same particle size range and average particle size as the coating composition A-2, and the same performances as obtained in Example 18 (Example 25).

EXAMPLE 26

To the aforesaid coating composition A-2, 5 parts of an adduct of 2,4,7,9-tetramethyl-5-decyne-4,7-diol with 30 moles on the average of ethylene oxide based on 100 parts of the resin particles therein is added as a flow agent, and further 5 parts of ethylene glycol based on 100 parts of water in the coating composition A-2 is added as a hydrophilic solvent to obtain a water-slurry coating composition.

The water-slurry coating composition has fairly improved anti-sedimentation properties compared with that in Example 18, and an excellent smoothness of the coating surface.

EXAMPLE 27, COMPARATIVE EXAMPLE 10

To the water-slurry coating composition in Example 18, one part of methyl cellulose (marketed by WAKO CHEMICAL INDUSTRIES CO., LTD., Japan, molecular weight 4000) based on 100 parts of the resin particles in the coating composition is added with the result that the anti-sedimentation properties of the resin particles is improved (Example 27). Further, 3 parts of methyl cellulose is added thereto with the result that the gloss of the coating surface is greatly reduced (Comparative Example 10).

COMPARATIVE EXAMPLE 11

To the aforesaid coating composition A-2, one part of methyl cellulose, which is the same as in Example 27, based on 100 parts of the solid content of the coating composition A-2 is added as a water-soluble thickening agent to obtain a water-slurry coating composition, which is subjected to anti-sedimentation properties and smoothness tests.

No considerable difference in anti-sedimentation properties is found between the water-slurry coating composition thus obtained and that in Example 27 for the period of 10 days or so, but the film obtained from the water-slurry coating composition thus obtained has a poor smoothness of the coating surface compared with that obtained from the water-slurry coating composition in Example 27.

EXAMPLE 28, COMPARATIVE EXAMPLE 12

To one part of an inorganic pigment (marketed by KUNIMINE INDUSTRIES CO., LTD., Japan, under the registered trademark KUNIPIA-F, consisting of purified bentonite), 9 parts of deionized water is added, and the resulting mixture is subjected to dispersion in an attritor for 2 hours to obtain a pigment suspension. To the water-slurry coating composition in Example 18, 10 parts of the pigment suspension thus obtained based on 100 parts of the resin particles therein (corresponding to one part of the pigment added thereto) is added with the result that the water-slurry coating composition thus obtained has a satisfactory anti-sedimentation properties, but the gloss of the coating surface is a little decreased (Example 28). Further, 3.5 parts of KUNIPIA-F is added thereto with the result that the gloss of the coating surface is greatly decreased (Comparative Example 12).

COMPARATIVE EXAMPLE 13

To the aforesaid coating composition A-2, one part of KUNIPIA-F based on 100 parts of the solid content of the coating composition A-2 is added in the same manner as in Example 28 to obtain a water-slurry coating composition, which is subjected to tests for the anti-sedimentation properties of the resin particles and the smoothness of the coating surface.

The water-slurry coating composition thus obtained has no considerable difference in anti-sedimentation properties compared with that in Example 28, but the film obtained from the water-slurry coating composition thus obtained has a poor smoothness of the coating surface compared with that in Example 28.

EXAMPLE 29

To the coating composition A-2, 5 parts of a flow agent obtained by adding 15 moles on the average of ethylene oxide to one mole of n-hexane-1,6-diol based on 100 parts of the solid content in the coating composition A-2 is added to obtain a water-slurry coating composition B-1 (hereinafter referred to simply as a coating composition B-1). The results of the test thereof as above are shown in Table 3.

EXAMPLE 30

Similarly to Example 29, to the coating composition A-2, 5 parts of an adduct obtained by adding 5 moles on the average of propylene oxide to one mole of n-hexane-1,6-diol and 2 parts of an adduct obtained by adding 20 moles on the average of ethylene oxide to one mole of n-hexane-1,6-diol based on 100 parts of the solid content in the coating composition A-2 respectively are added and subjected to dispersion in an attritor for about one hour to obtain a water-slurry coating composition B-2 (hereinafter referred to simply as a coating composition B-2). The results thereof as above are shown in Table 3.

COMPARATIVE EXAMPLE 14

To the aforesaid coating composition A-2, 5 parts of polyethylene glycol (marketed by WAKO CHEMICAL INDUSTRIES CO., LTD., Japan, molecular weight 1500) based on 100 parts of the solid content in the coating composition A-2 is added as a flow agent in the form of 50% aqueous solution thereof to obtain a water-slurry coating composition B-3 (hereinafter referred to simply as a coating composition B-3).

Similarly to the above, the results thereof are shown in Table 3.

TABLE 3

| Examples | Ex. 29 | Ex. 30 | Com. Ex. 14 |
|---|---|---|---|
| Coating Composition | B-1 | B-2 | B-3 |
| Anti-sedimentation Properties of Particles | 3 | 3 | 2 |
| Redispersibility | 4 | 4 | 3 |
| Smoothness of Coating Surface | 4 | 4 | 4 |
| Water Resistance | 4 | 4 | 2 |
| Checking | 4 | 4 | 4 |
| Pinholing and Cratering by Solvent Popping | 3 | 3 | 3 |

EXAMPLE 31, COMPARATIVE EXAMPLE 15

Acrylic thermosetting resin particles (white) are prepared in accordance with the following formulation similarly to the preparation process in Example 1.

| Ingredients | Part by Weight |
|---|---|
| Acrylic Copolymer Resin[2] | 86.0 |
| Decamethylene-dicarboxylic acid | 14.0 |
| Rutile Titanium Dioxide | 50.0 |
| Surface Levelling Agent | 1.0 |

-continued

| | 151.0 |

(2)A resin having the following monomer composition, a number-average molecular weight of about 20,000, and a softening point of about 80° C.:

| Monomer | % by Weight |
|---|---|
| Glycidyl Methacrylate | 20.0 |
| Methyl Methacrylate | 25.0 |
| Styrene | 25.0 |
| n-Butyl Methacrylate | 30.0 |
| | 100.0 |

To 100 parts of the resin particles thus obtained, 0.1 parts of an anionic surface active agent (marketed by KAO ATLAS CO., LTD., Japan, under the registered trademark DEMOL-N) and 122 parts of deionized water are added and subjected to dispersion in an attritor for one and half hours to obtain a water-dispersed heat curable coating composition C-1 (hereinafter referred to simply as a coating composition C-1). The result of the measurement f particle size by a microscope shows to be of from 8 to 25 microns, the average particle size being about 15 microns (Comparative Example 15).

Thereafter, to the coating composition C-1, 5 parts of an adduct obtained by adding 30 moles on the average of ethylene oxide to one mole of 2,4,7,9-tetramethyl-5-decyne-4,7-diol based on 100 parts of the resin particles is added as a flow agent to obtain a water-slurry coating composition C-2 (hereinafter referred to simply as a coating composition C-2) (Example 31).

The coating compositions C-1 and C-2 are subjected to the same tests as above. The results are shown in Table 4.

TABLE 4

| Examples | Com. Ex. 15 | Ex. 31 |
|---|---|---|
| Coating Composition | C-1 | C-2 |
| Anti-sedimentation Properties of Particles | 1 | 3 |
| Redispersibility | 1 | 4 |
| Smoothness of Coating Surface | 2 | 4 |
| Water Resistance | 4 | 4 |
| Checking | 3 | 4 |
| Pinholing and Cratering by Solvent Popping | 2 | 3 |

EXAMPLE 32, COMPARATIVE EXAMPLE 16

Similarly to the preparation process in Example 1, polyester thermosetting resin particles (white) are prepared in accordance with the following formulation:

| Ingredients | Part by Weight |
|---|---|
| Hydroxyl Group Functional Polyester Resin(1) | 80.0 |
| Blocked-isocyanate Curing Agent(2) | 20.0 |
| Rutile Titanium Dioxide | 50.0 |
| Organo-tin Compound Catalyst | 1.0 |
| Surface Levelling Agent | 1.0 |
| | 152.0 |

(1)Marketed by YOKOHAMA CHEMICALS CO., LTD., Japan, under the registered trademark URALAC P-2604, softening temperature about 96° C.
(2)Marketed by VEVA CHEMICAL CO., LTD. Germany, under the registered trademark ADDUCT B-989.

To the resin particles thus obtained, 0.1 part of a nonionic surface active agent (marketed by DAI-ICHI KOGYO SEIYAKU CO., LTD. Japan, under the registered trademark NOIGEN ET-143) and 122 parts of deionized water are added and subjected to dispersion in an attritor for one hour to obtain a water-dispersed heat curable coating composition D-1 (hereinafter referred to simply as a coating composition D-1).

The result of the measurement of the particle size by microscope shows to be of from 15 to 35 microns, the average partcle size being about 25 microns (Comparative Example 16).

Thereafter, to the coating composition D-1 thus obtained, 5 parts of an adduct obtained by adding 30 moles on the average of ethylene oxide to one mole of 2,4,7,9-tetramethyl-5-decyne-4,7-diol based on 100 parts of the resin particles is added as a flow agent to obtain a water-slurry coating composition D-2 (hereinafter referred to simply as a coating composition D-2) (Example 32).

The coating compositions D-1 and D-2 are subjected to the same tests as above described to obtain the following results as shown in Table 5.

TABLE 5

| Examples | Com. Ex. 16 | Ex. 32 |
|---|---|---|
| Coating Composition | D-1 | D-2 |
| Anti-sedimentation Properties of Particles | 1 | 3 |
| Redispersibility | 1 | 4 |
| Smoothness of Coating Surface | 2 | 4 |
| Water Resistance | 4 | 4 |
| Checking | 2 | 4 |
| Pinholing and Cratering by Solvent Popping | 2 | 3 |

What is claimed is:

1. A thermosetting powder resin based water-slurry coating composition comprising a slurry formed by dispersing thermosetting resin particles, said thermosetting resin particles being water insoluble and solid at room temperature, and an adduct of a structurally symmetrical diol having a molecular weight of from 90 to 300, with ethylene oxide or propylene oxide, or a mixture thereof in an aqueous medium.

2. A thermosetting powder resin based water-slurry coating composition comprising a slurry formed by dispersing 100 parts by weight of thermosetting resin particles, said thermosetting resin particles being water insoluble and solid at room temperature, and 1 to 20 parts by weight of an adduct of a structurally symmetrical diol having a molecular weight of from 90 to 300, with ethylene oxide or propylene oxide, or a mixture thereof in 40 to 400 parts by weight of an aqueous medium.

3. A coating composition according to claim 1 or 2, wherein said thermosetting resin particles have an average particle size of from 3 to 50 microns and a softening point of from 30° to 120° C.

4. A coating composition according to claim 1 or 2, wherein said adduct is prepared by adding 4 to 100 moles of ethylene oxide or propylene oxide to one mole of said diol.

5. A coating composition according to claim 1 or 2, wherein said diol is selected from the group consisting of bisphenol A, n-hexane-1,6-diol, 3,6-dimethyl-4-octyne-3,6-diol, and 2,4,7,9-tetramethyl-5-decyne-4,7 diol.

6. A coating composition according to claim 1 or 2, wherein said aqueous medium contains 0.01 to 1.0 part by weight of a surface active agent and/or 0.01 to 5.0 parts by weight of a hydrophilic solvent based on 100 parts by weight of water respectively.

7. A coating composition according to claim 1 or 2, wherein said aqueous medium contains 0.01 to 1.0 part by weight of a water soluble thickening agent and/or 0.01 to 3.0 parts by weight of an inorganic pigment based on 100 parts by weight of said thermosetting resin particles respectively.

* * * * *